(12) United States Patent
Cheston et al.

(10) Patent No.: US 7,143,067 B1
(45) Date of Patent: Nov. 28, 2006

(54) SYSTEM AND METHOD FOR INSTALLING PERSONAL COMPUTER SOFTWARE

(75) Inventors: Richard W. Cheston, Morrisville, NC (US); Daryl C. Cromer, Cary, NC (US); Richard A. Dayan, Wake Forest, NC (US); Dhruv M. Desai, Cary, NC (US); Jan M. Janick, Research Triangle Park, NC (US); Howard J. Locker, Cary, NC (US); David B. Rhoades, Apex, NC (US); James P. Ward, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 225 days.

(21) Appl. No.: 09/248,160

(22) Filed: Feb. 9, 1999

(51) Int. Cl.
  *G06Q 99/00* (2006.01)
  *H04K 1/00* (2006.01)
  *H04L 9/00* (2006.01)

(52) U.S. Cl. ................................................. 705/59

(58) Field of Classification Search .................... 705/1, 705/30, 51, 56, 3, 8; 700/1, 108; 717/11, 717/10; 713/1, 2, 3; 380/4, 44, 46, 23, 30; 709/209, 220, 221, 222
See application file for complete search history.

(56) References Cited

U.S. PATENT DOCUMENTS 4,685,055 A * 8/1987 Thomas ...................... 364/200

(Continued)

FOREIGN PATENT DOCUMENTS

EP         601 500 A1 *  6/1994

(Continued)

OTHER PUBLICATIONS www.patents.ibm, Software Custom Installation for Nodes in a Netw, pp. 1.*

(Continued)

*Primary Examiner*—Arthur Duran
(74) *Attorney, Agent, or Firm*—Carlos Munoz-Bustamante; Dillon & Yudell LLP

(57) ABSTRACT

A system and method for installing a customized set of software on a personal computer, tailored to the requirements of the prospective user and avoiding unnecessary software and attendant license fees. Software (all that may be desired) in unusable form is loaded onto the personal computer then selected software (that which a particular user may require and/or desire) is converted (decompressed and/or decrypted) to produce usable versions of the selected software while the other software may be erased, if desired, to free up space in storage. The selection of software is done on the user's function (department and/or mission) and may be supplemented by a user selection from a menu, based on a selection utility.

21 Claims, 4 Drawing Sheets

U.S. PATENT DOCUMENTS

| | | | |
|---|---|---|---|
| 5,155,680 A * | 10/1992 | Wiedemer | |
| 5,319,705 A * | 6/1994 | Halter et al. | 380/4 |
| 5,794,052 A * | 8/1998 | Harding | 395/712 |
| 5,809,300 A * | 9/1998 | Utsumi et al. | 395/651 |
| 5,860,012 A * | 1/1999 | Luu | 395/712 |
| 5,875,247 A * | 2/1999 | Nakashima et al. | 380/4 |
| 5,881,236 A * | 3/1999 | Dickey | 395/200.51 |
| 5,887,164 A * | 3/1999 | Gupta | 395/652 |
| 5,927,050 A * | 7/1999 | Houck et al. | 53/428 |
| 5,953,533 A * | 9/1999 | Fink et al. | 395/712 |
| 6,006,035 A * | 12/1999 | Nabahi | 395/712 |
| 6,243,745 B1 * | 6/2001 | Casey et al. | 709/220 |
| 6,289,512 B1 * | 9/2001 | Edwards et al. | 717/11 |
| 6,367,073 B1 * | 4/2002 | Elledge | 717/11 |
| 6,530,019 B1 * | 3/2003 | Carroll | 713/2 |

FOREIGN PATENT DOCUMENTS

| | | |
|---|---|---|
| JP | 03228136 | 9/1991 |
| JP | 07239767 A | 9/1995 |
| JP | 08-234967 | 9/1996 |
| JP | 10097420 A | 4/1998 |

OTHER PUBLICATIONS www.chips.chalmers, Christer Bernerus, pp. 1-6.*

* cited by examiner

SYSTEM AND METHOD FOR INSTALLING PERSONAL COMPUTER SOFTWARE

CROSS REFERENCE TO RELATED PATENTS

The present invention is related to the following other patents, all of which are assigned to the assignee of the present invention:

1. A patent application entitled "Data Processing System and Method for Prohibiting Unauthorized Access of Data Stored on a System Device", Ser. No. 09/246,383, filed on Feb. 9, 1999 by Daryl Cromer et al. This application is sometimes referred to as the Personal Computer Security reference.

2. U.S. Pat. No. 5,319,705 entitled "Method and System for Multimedia Access Control Enablement", filed Oct. 21, 1992 by Bernard J. Halter et al. and issued Jun. 7, 1994. This patent is sometimes referenced as the Distribution of Encrypted Software reference.

3. A patent application entitled "In-Box Configuration Method for a Computer System", Ser. No. 08/972,462 filed Nov. 14, 1997 by Keith Houck et al. This application is sometimes referred to as the Software Loading reference.

The teachings of the foregoing patents and applications are specifically incorporated herein by reference.

FIELD OF THE INVENTION

The present invention relates to installing software on personal computers and rendering it usable, particularly for a large, diverse organization or a plurality of users with differing software requirements. More specifically, the present invention relates to a method and system for initial deployment of personal computers loaded with selected software ready for use, throughout a diverse organization or to a diverse set of users, where different users require different software.

BACKGROUND OF THE INVENTION

Personal computers in general and IBM personal computers in particular have attained widespread use for providing computing power to many segments of today's modern society for handling information in the form of digital data. These personal computers are either a desktop, floor-standing or portable microcomputer that consists of a system unit having a single system processor and associated volatile and nonvolatile memory; a display; a keyboard and other input device; data storage in the form of one or more diskette drives and/or a fixed disk drive or a nonvolatile memory equivalent; and possibly an optional printer or other output device. These personal computers have the capacity to operate in a stand-alone environment but are frequently connected to a data transmission network in order to provide the additional capability to share data and programs with other computers attached to the network, frequently using a network technology such as token ring or ethernet communications.

These personal computers perform a wide variety of data processing applications, the variety largely resulting from software loaded on and employed by the personal computer, since personal computer hardware is generally rather homogenous from one data processing application to the next. A significant variation in the data processing applications used by an individual employee will be found throughout a large corporation.

Thus, a large corporation may be broken down into an accounting organization, an engineering organization and a manufacturing organization as well as other specialized organizations like graphics, administrative, personnel, legal, and customer service. The accounting organization will be using spreadsheet and general ledger software as well as accounts payable and accounts receivable software, while the engineering organization may be focused on computer-aided design and computer aided manufacturing (CAD/CAM) applications as well as finite element analysis (FEA) programs. A manufacturing organization may be most interested in material requirements planning (MRP) software and enterprise resource planning (ERP) software, while the graphical arts department may be using software for graphical presentations. Word processing programs may be useful in an administrative or secretarial department and other functions may have their own specific software applications which are designed for data processing for their unique operations. While many users will have functional requirements which require specialized and unique software, most, if not all of the personal computer users will use general purpose software (e.g., operating systems, browsers for Internet access and mail functions for communications within the organization).

In a large company, then, there is a need for each personal computer workstation to have a variety of software, some of which is general purpose and other of which is customized to the needs of the user. Generally, software is licensed on a per user or per workstation basis, and the software costs for a workstation will often be much greater than the cost of the hardware.

Thus, a large company will want to match the software on the workstation to the user's requirement and provide neither too little software (because the user will not be able to perform his job responsibilities optimally) nor too much software (because of the cost of the licenses and the fact that inappropriate software will not be used efficiently or not at all).

There are two different approaches in general use to set up personal computers with the appropriate software matched to the prospective user. The first approach is to load a common set of base software (required by all users) on each personal computer, then download the unique requirements for each user, using a data transmission network. In theory, unique software could also be loaded from individual software media (diskettes or CD ROMs, but with the number of programs in use and the size of the programs, such a system for loading software is too cumbersome to be used commercially. The second approach is load everything which any user (e.g., in any part of the company) will want to use, and then have the user either ignore the unwanted software or delete it.

The first approach has the disadvantage that downloading the unique software using the network requires a significant bandwidth of the network, preventing the network from performing its useful functions while it is downloading the software to each personal computer workstation. Since the software programs are getting progressively larger over time (the software has additional function and improved presentation graphics as well as improved interfaces, error messages and help screens, for example), so these downloads will take up more of a limited resource of the network and require the networks to be designed to handle large peak loads. Further, some of the personal computers are located remote and connected by modem rather than by network, making the communication bandwidth even more limited.

An application of this first approach is described in more detail in the Software Loading reference mentioned above.

The second approach of loading all the software on each workstation or personal computer has the disadvantage that license fees for software would incurred even though the particular copy of the software would not be used—e.g., the general ledger program for the engineering department or the manufacturing department, the finite element analysis program for the accounting department.

Since the number of personal computers and users in some companies is in the thousands, and since the number of software applications involved may exceed one hundred, the extra loading on the network (from using the first approach) or the cost of unnecessary licenses (from using the second approach) is substantial.

The systems for loading software onto computers also have application to a retail operation where an entity offers computers to a variety of purchasers in the public with a variable initial load of software. The desired software (that requested by any given puchaser) could be selected, then installed, or the entire selection of available software could be preloaded onto each computer. In either case, then, the same disadvantages are present: if only the selected software is loaded, then communications resources are consumed to download the selected software. If all the software is pre-loaded without regard to what the use the specific purchaser may want or need, then additional license costs will be incurred for software which is neither needed nor wanted.

Accordingly, it is desirable to avoid incurring license fees for software which is not to be used by the user of a particular personal computer workstation while avoiding unnecessary loading of the network connecting the personal computers to a host.

Other limitations and disadvantages of the prior art systems for installing software selectively on a plurality of computers will be apparent to those skilled in the art in view of the following description of the present invention taken in conjunction with the appended claims and the accompanying drawings.

SUMMARY OF THE INVENTION

The present invention overcomes the limitations and disadvantages of the prior art systems by providing a system and method for loading a selection of software applications on personal computers which are customized to the prospective users without incurring the overhead of downloading the applications through the network and while avoiding the license fees for unnecessary and unwanted software.

The present invention has the advantage that it becomes easy to customize a workstation or personal computer for the prospective user with the software applications which that user will need and use and avoiding unnecessary software applications which would otherwise take up space on the storage of the personal computer and which would require unnecessary royalties.

The present invention has the advantage that only the software which is appropriate for the prospective user will be installed for use on his personal computer and only that software installed for use will incur software license fees, avoiding software license fees for software that is not selected for any particular user.

The system and method of the present invention also has the advantage that a listing of the users and their respective software is maintained so that upgrades can be managed and computers with particular combinations of loaded software can be generated if needed. The listing of software installed for use on computers can also be used for generating a list of machines on which royalties are to be paid, which can serve as both a listing of the royalties due and a "receipt" showing the computers on which a royalty for the listed software has been paid.

Other objects and advantages of the present invention will be apparent to those skilled in the relevant art in view of the following detailed description of the preferred embodiment taken together with the accompanying drawings and the appended claims.

BRIEF DESCRIPTION OF THE DRAWINGS

Some of the purposes of the invention having been stated, others will appear as the following description proceeds, when taken in connection with the accompanying drawings in which.

DETAILED DESCRIPTION OF THE PREFERRED EMBODIMENT

While the present invention will be described more fully hereinafter with respect to the accompanying drawings in which the best embodiment presently contemplated by the inventions is described, it should be understood at the outset of the description of the present invention that those persons skilled in the art to which this invention relates may modify the invention described herein while achieving the beneficial results of the invention. Accordingly, the following description of the invention should be considered as merely illustrative of the principles of the invention and not in limitation thereof.

Figure 1:
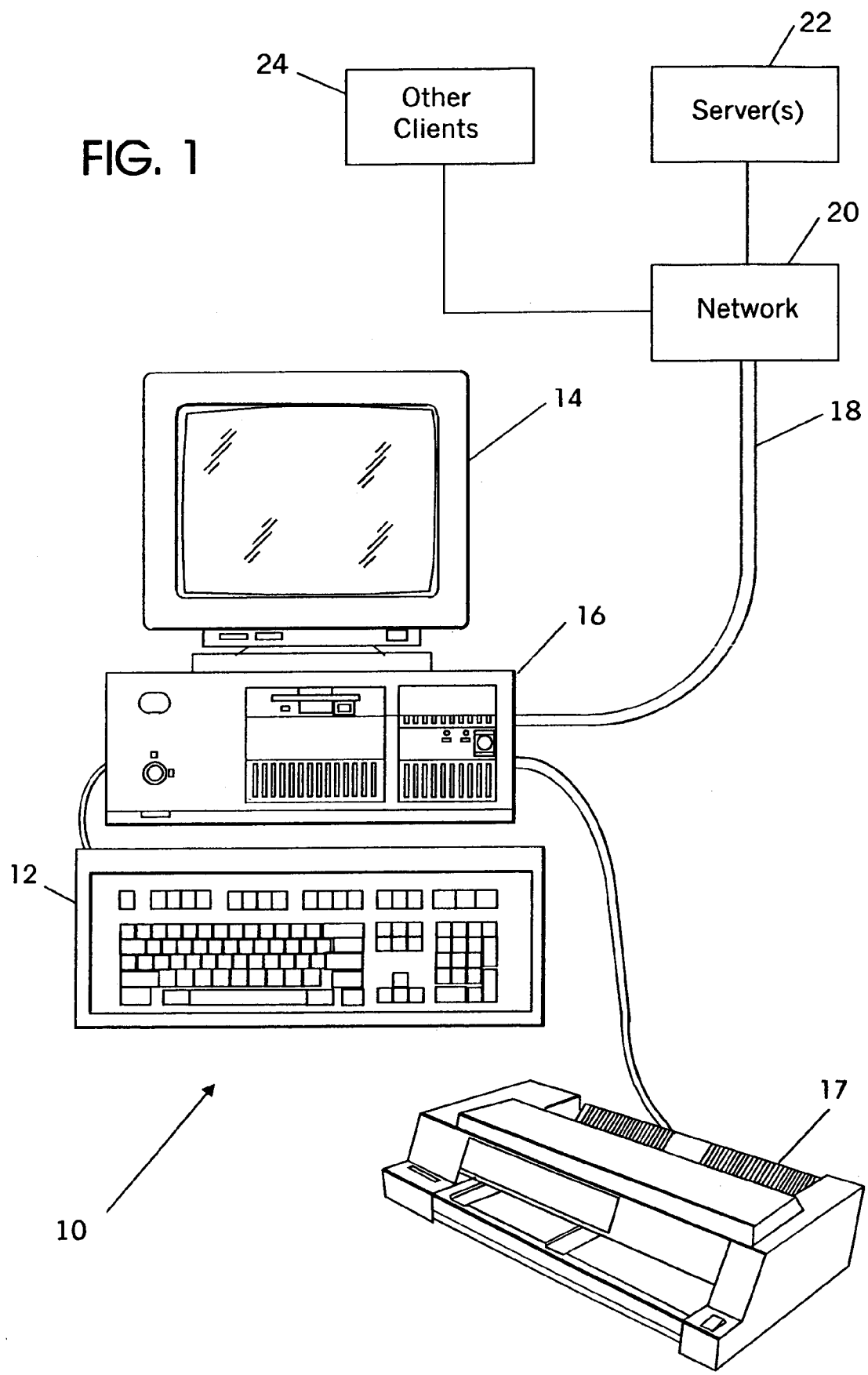
FIG. 1 is a perspective view of a personal computer suitable for use in the present invention.

FIG. 1 shows a perspective view of a personal computer 10 with a keyboard 12, a display (or monitor) 14 and a processing unit 16, also sometimes referred to as a system unit. In its customary configuration, the processing unit 16 contains various internal components including an internal hardfile (not shown) which serves as nonvolatile storage for programs and data. An optional printer 17 is shown, connected by a printer cable to the processing unit 16 to provide output in printed form from the personal computer 10. The personal computer 10 also includes a connection through a line 18 to a data transmission network 20, using a conventional communication technique such as token ring, asynchronous transfer mode (ATM) or Ethernet data transmission techniques. The data transmission network 20 is shown connected to one or more servers 22 and to other clients 24.

Figure 2:
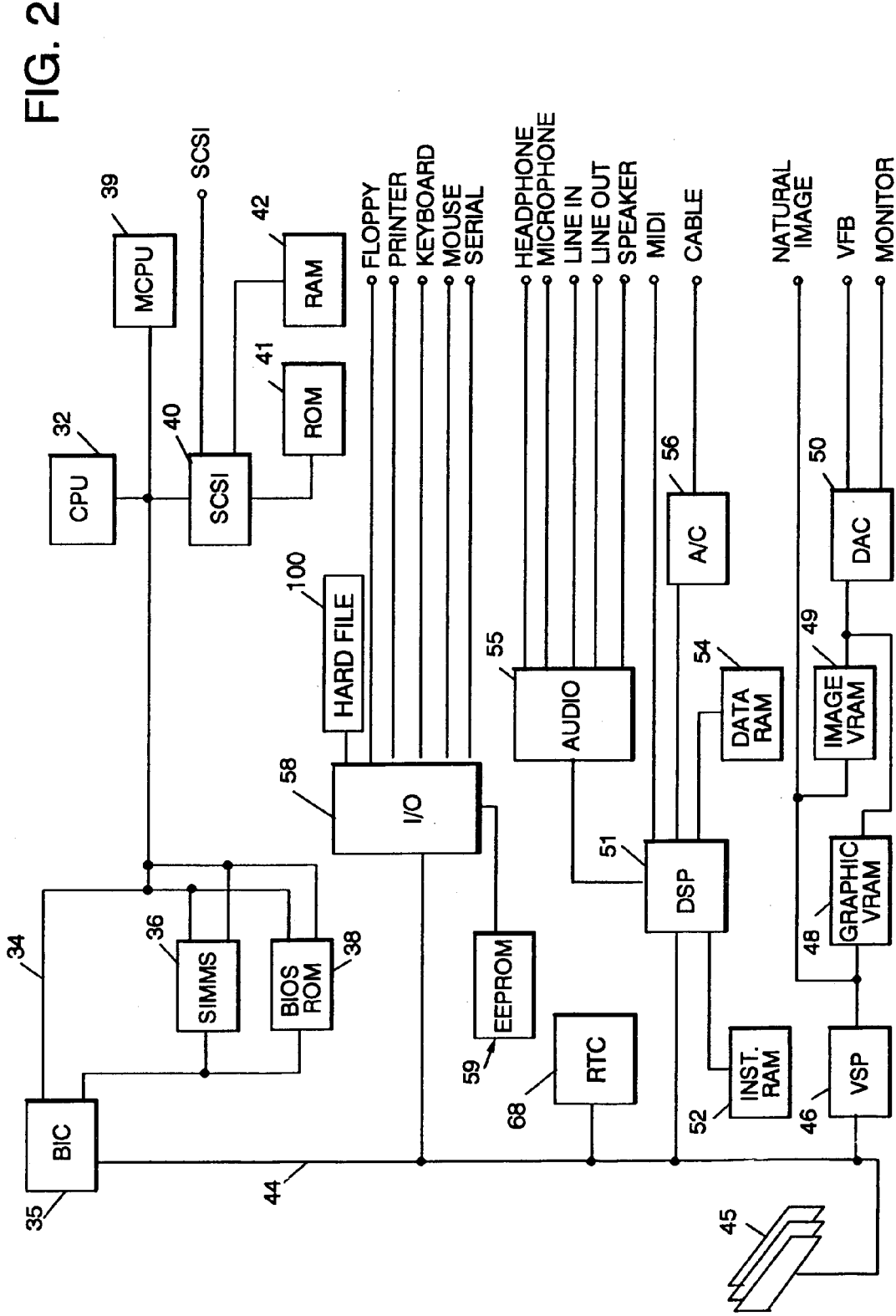
FIG. 2 is a pictorial or block diagram representation of certain components of the personal computer of FIG. 1.

FIG. 2 shows a logical or block diagram of certain internal components of the personal computer 10. The personal computer 10 includes, in its typical configuration, various components which are typically mounted on a planar board inside the processing unit 16 and connected to the various I/O slots and other hardware of the personal computer 10. A system processor (or CPU) 32 is mounted to the planar board and provides the main or central data processing function for the personal computer 10. While any appropriate microprocessor could be used in the present invention, a Pentium or Pentium Pro microprocessor from Intel or similar processor from other manufacturers like IBM or American Micro Devices would be suitable, although a 80486 or 80386 processor could also be used as the CPU. The CPU 32 is coupled by a high speed CPU local bus 34 to a bus interface control (BIC) unit 35 which is attached to an input/output (I/O) control unit 58, which, in turn, is connected to various output devices such as the printer 17 or the hardfile (nonvolatile storage) 100. (The nonvolatile storage or hardfile 100 on some personal computers may use the small computer standard interface (SCSI) and may depend from SCSI controller 40 instead of the I/O control unit 58, but, for the purposes of the present invention, the specific connection of the hardfile 100 to other components of the personal computer is not particularly relevant, so long as the hardfile 100 is operatively connected.) The details of other components of the personal computer 10 shown in FIG. 2 are described in detail in various publications and issues patents, including, for example, U.S. Pat. No. 5,341,422, a patent entitled "Trusted Personal Computer with Identification" by John W. Blackledge et al. and assigned to the assignee of the present invention, particularly at Columns 7–9. The specification of the '422 patent is specifically incorporated herein by reference, particularly for details about the structure and function of personal computers in general and the environment of a representative embodiment for the present invention. The hardfile or nonvolatile memory serves as storage device for software programs and data, and is represented by reference numeral 100 and is coupled to the input/output control unit 58. Such hardfiles or storage devices are conventional in design and available from a variety of manufacturers, varying functionally primarily in storage size.

Figure 3:
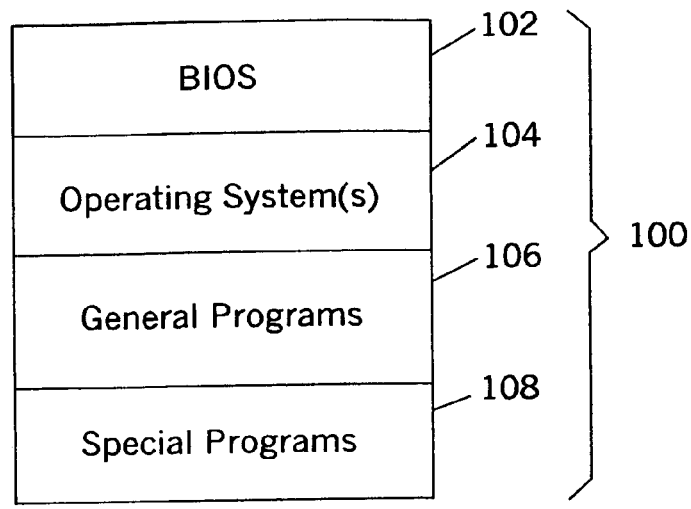
FIG. 3 shows a mapping diagram of the hardfile or storage of the personal computer of FIG. 1.

FIG. 3 depicts a mapping of the organization of the hardfile (or nonvolatile storage) 100 of the personal computer 10 of the present invention. The hardfile or nonvolatile storage 100 is shown divided into a plurality of identified regions. The number of storage regions and the storage allocation (that is, which programs are stored in which region) are a matter of design choice and not integral to the present invention, but depend on the needs of the designers and users and the diversity of functions within the organization. The organization of the hardfile into regions may be specific (as would result from storage of programs into partitioned areas or separate directories or subdirectories) or may be primarily logical (without physical indications and in a single, continuous region) according to the desires of the designer.

As shown in FIG. 3, the hardfile or storage 100 includes a first region 102 in which machine-specific routines and programs are stored. A second region 104 of the hardfile 100 contains one (or more) operating system(s) for the personal computer 10. A third region 106 of the hardfile 100 stores general purpose software programs, applications which are useful to the various users in the organization. Examples of such general purpose programs or applications are word processing applications, Lotus Notes (mail) program, host connection applications and similar programs of general applicability. A fourth region 108 of the hardfile 100 is the location for storing software applications applicable only to certain subsets of users in the organization. For example, a general ledger application, CAD/CAM application and graphics applications are relevant to the accounting, design and/or engineering and graphical arts departments, respectively. These regions are logical in nature, how they are mapped onto a physical hardfile is not important to the present invention and a function of the BIOS or device drive controlling the device.

Of course, the regions described above (regions 102, 104, 106 and 108) are not restricted to that described above and some of the regions may be implemented in a plurality of sub regions for particular users; for example, for functions such as accounting or engineering, the region 108 for function-specific software may be implemented as multiple regions, such as a fifth, sixth and seventh region. Additional application-specific region(s) could also be included for those individuals who have cross function responsibilities.

The machine-specific routines and programs in the first region 102 include the basic input/output system (BIOS) which is common on personal computers and other programs which are essential to the proper operation of the personal computer but which are not really selectable by a user. The programs in this first region 102 also include drivers and programs for the effective use of peripherals associated with the personal computer, such as the modem.

The second region 104 includes programs such as operating systems such as OS/2* or Microsoft Windows* or PC Dos 2000 operating system. (Throughout this patent, an asterisk "*" is used to indicate a trademark or a registered trademark of its respective owner, for example Microsoft Corporation for Microsoft Windows and IBM for OS/2). An operating system is the foundation application, upon which all additional applications are loaded and which does many of the routine functions for the application programs. If multiple operating systems are installed on a personal computer, a boot manager is also installed, preferably in the second region 104, for selecting the operating system to be used for a session.

The third region 106 includes general purpose programs which are being loaded for use on all personal computers. This third region 106 stores programs for communicating between various users on the network (such as Lotus Notes*) and for browsing the Internet (such as Netscape* and/or Microsoft Explorer* software), programs which are for general use and not specific to a department or function.

The fourth region 108 includes all of the other programs which are applicable to some user and not to other users. This would include the finite element analysis (FEA) program for the engineering department, the general ledger program for the accounting department, the graphics package for the graphic arts department and so forth. The programs in this region are stored in an unusable form until activated for use (converted into usable form) so that license fees would not be required. In addition to the previously-identified regions of the hardfile 100, the rest of the hardfile 100 would be free space which is not specifically identified in FIG. 3.

Figure 4:
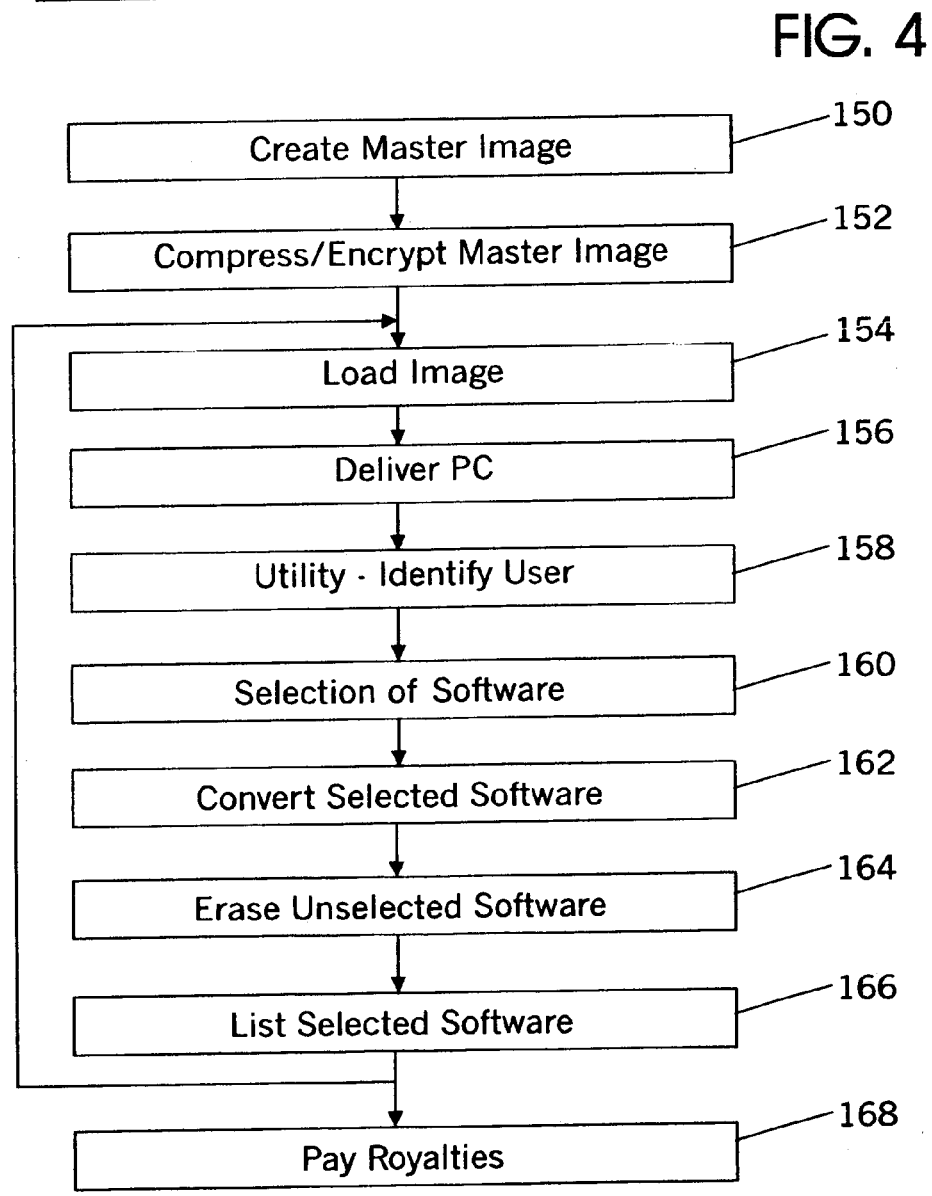
FIG. 4 is a block diagram of the process by which software is loaded and rendered usable on the personal computer of the preceding figures.

FIG. 4 illustrates the steps of a process by which the personal computer 10 is set up for initial use, loaded with the desired software suitable for use. This process may be implemented either during the manufacture or assembly of the personal computer 10 prior to shipment to the customer or at the time of deployment of the personal computer by information technology (IT) professionals, depending on the particular organization involved, or by some combination of the two processes. The process by which the programs are loaded on to the personal computer 10 and made ready for use is as follows: A master load of all computer programs used by the potential users is prepared at block 150 in a suitable form, either as a separate media such as a CD ROM or as an image on a separate server such as is described in the Software Loading Patent. The master image is then converted into an unusable form by techniques such as compression (using known techniques such as PKZIP compression and/or encryption using known data encryption techniques with one or more encryption keys) at block 152. Once the master image has been compressed and/or encrypted, it is in an unusable form until it is decompressed using a decompression technique (such as PKUNZIP) and/or decrypted using an appropriate key to reverse the compression and/or encryption. The converted and/or encrypted master image is then copied onto each personal computer (one at a time, without using the data transmission network) at block 154.

This could be accomplished using the system described in connection with the Software Loading Patent where a computer such as a "master" personal computer with a network attachment is operatively connected to the personal computer to be loaded (the "target" personal computer) and the entire suite of software is loaded from the master to the target on a non-production or isolated network, or off-hours on a production network. While many pieces of individual software programs are now resident on the personal computer, none of them are usable by the personal computer until each piece of software to be used is decrypted and/or decompressed, with the compression serving to minimize the space that the software takes up on the storage of the personal computer and the encryption serving to prevent unauthorized use or copying of the software. This preloading of all potential applications in compressed form saves loading time and space and avoids using bandwidth of the data transmission network and the time required over a modem is saved. Encryption of the applications serves to prevent unauthorized use or copying of the applications.

Each personal computer is then delivered at block 156 for customization. This delivery could be to the end user of the particular personal computer or to an IT professional who is customizing each personal computer for the end user. As will be described later in connection with the utility program, the user is identified at block 158. This identification of the user is accomplished in any appropriate manner. The software to be loaded could be based on the well-known Universally Unique ID (UUID) and allows for the identification of the platform software suitable for the user, based on a listing in the utility, from a remote server through the data transmission network or because a functional area (such as accounting) has been entered. In any event, the user is identified at block 158 and a proposed load of software is listed for selection at block 160. This selection may be effective to add software which would not otherwise be selected or to delete software which would normally be loaded, allowing a user to customize the software to be operating and usable on his personal computer.

Once the software for a particular personal computer has been selected at the block 160, then the selected software is converted from unusable form into usable form. Many personal computers have a utility for decompressing software and the Personal Computer Security Reference proposes that software to accomplish decryption be installed on personal computers to provide for conversion of encrypted files into usable files. Of course, the decompression must match the compression technique used (so if the software in the master image was compressed with PKZIP, then the complementary PKUNZIP would be used to decompress the software) and the decryption must use the complementary decryption to the encryption, with an appropriate key. The key may be the same for each program or each program may have a separate key and the data transmission network can be used to obtain the key for the software which has been selected at the block 162.

Unselected (unwanted) software from the personal computers may be removed (if this option is desired) by erasing the storage at block 164. While erasing unselected software will free up some storage space on the hardfile, erasing the software then would preclude its later selection and activation. So, some corporations will prefer to skip the step of erasing the unselected software to allow the software to remain in place in unusable form until it is desired, then converting it into usable form, using an alternate technique such as calling a service number for a decryption key and arranging for payment of the royalties associated with the license of the software involved. The concept is that any given software is converted into usable form only when there is a mechanism to provide for the payment of royalties for the particular software.

At block 166 a list of the selected software (and converted) is prepared and used for paying royalties. This list may be communicated through the data transmission network to the server or may be prepared in some other form (such as a printed list) to facilitate the payment of the royalties, since the form of the communication is not particularly crucial to the practice of the present invention. However, the list of what software is installed on which personal computer for which user is available for future use. Such a listing is used to provide updates to the software (since only the personal computers with a given piece of software will require the updates) or to locate a personal computer with a particular configuration of software (e.g., for testing).

If there are additional personal computers to be loaded with software, then the process returns to block 154 and repeated. If the personal computer is the last one for a particular corporation, then the necessary royalties for software usage are calculated based on the number of computers upon which each piece of software has been loaded in usable form and the royalties paid at block 168.

Figure 5:
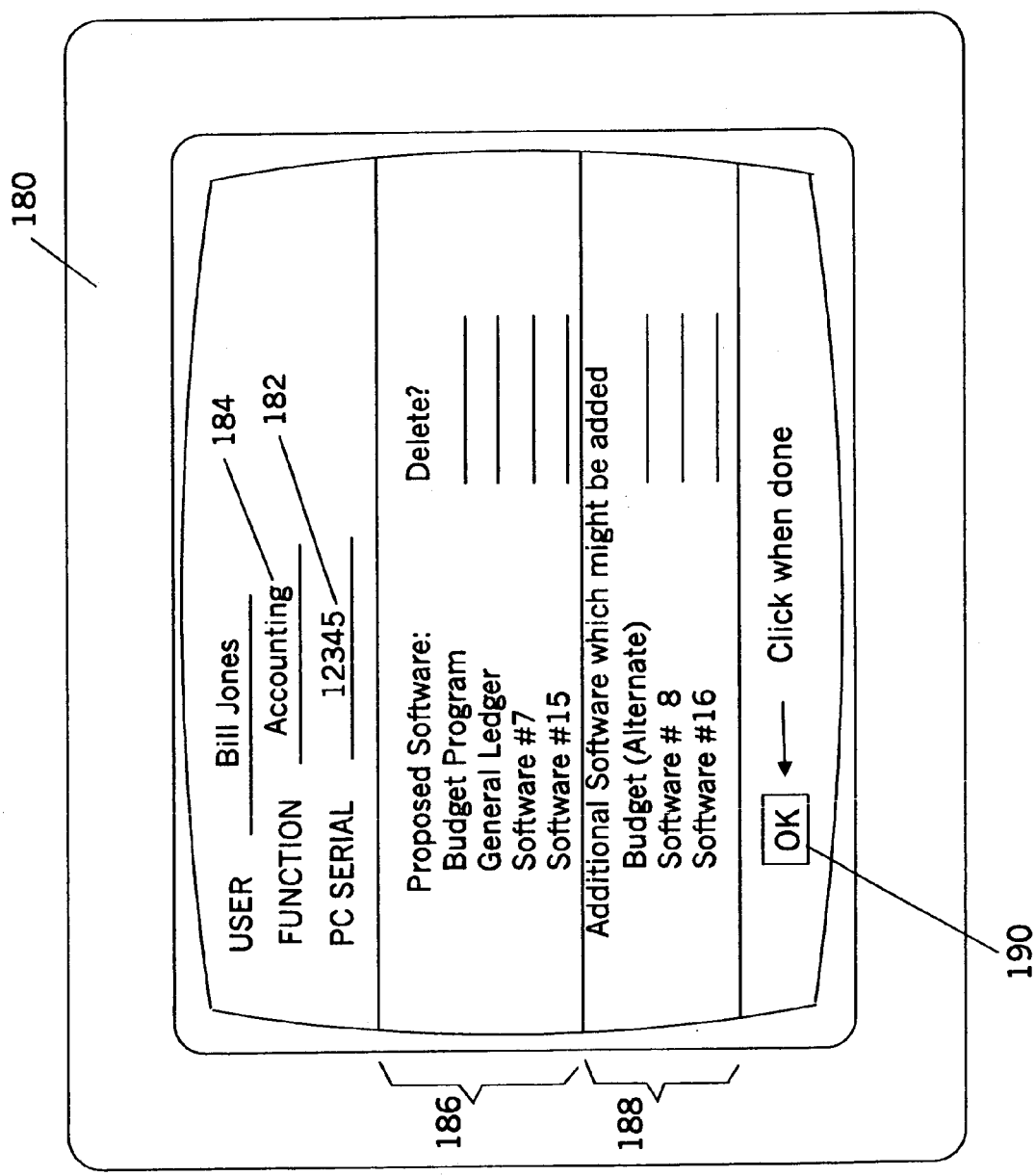
FIG. 5 illustrates a software selection utility useful in practicing the present invention.

FIG. 5 illustrates the utility for selecting the software. The user is identified at line 180 and the serial number of the personal computer is on line 182. Line 184 is the function of the user, either from a data entry or from a table stored and available to the computer. Based on the identity of the user at line 180 and his function at line 184, a proposed listing of software is presented to the user in block 186, with additional software which would not normally be loaded listed in block 188. Based on the user preferences, software listed in block 186 is marked for deletion and software marked for inclusion in block 188 is used to change the software to be loaded. Once the selections are marked as final, by clicking on an OK icon 190, the list of identified software is created at the block 160.

Of course, many modifications and adaptations to the preferred embodiment disclosed above could be made without departing from the spirit of the present invention. Those skilled in the art would also recognize the many substitutions which could be employed to advantage in the system disclosed. Further, some of the features of the present invention could be used to advantage without the corresponding use of other features. For example, software could be selected without using the utility described above. Accordingly, the foregoing description should be considered as merely illustrative of the principles of the present invention and not in limitation thereof, since the scope of the present invention is defined solely by the following claims.

Having thus described the invention, what is claimed is:

1. A personal computer system initially loaded with software including selected and non-selected software in unusable form, with the selected software later converted and loaded thereon in usable form, the computer including a processor, a storage device coupled to the processor for storing programs therein, with selected programs stored in the storage device in usable form after conversion from unusable form, said selected programs having been selected based on the user's position and requirements, said selected programs having been converted by the processor from unusable form and stored in usable form, with non-selected programs not being converted into usable form, said personal computer creating a list of the selected software for paying royalties on only the selected software.

2. A personal computer system of the type described in claim 1 wherein the personal computer processor includes a software module which erases the non-selected software to remove it from the personal computer.

3. A personal computer system of the type described in claim 1 wherein the personal computer includes a software module for converting the selected software from an unusable form into an usable form in response to the selection and the list of selected software upon which a royalty is paid is the software which is converted from unusable to usable form.

4. A personal computer system of the type described in claim 1 wherein the personal computer includes a software module for converting the selected software from an encrypted form into an unencrypted form and the list of selected software upon which a royalty is paid includes the software which is converted from encrypted to unencrypted form.

5. A personal computer system of the type described in claim 4 wherein the personal computer includes a software module for converting the selected software from a compressed form to an uncompressed form.

6. A personal computer system of the type described in claim 1 wherein the computer includes a software module for selection of the selected software, including means to input the user's function and to select software for addition or deletion based on the software associated with the user's function.

7. A method of installing a variable selection of software programs on a personal computer, the steps of the method comprising:
    loading onto the personal computer storage a plurality of software programs in unusable form, including some software programs needed for that computer and other software programs which are not needed for that computer;
    selecting the software programs which are needed for that personal computer;
    converting from unusable form into usable form the software programs which have been selected;
    storing the converted software programs in usable form into the storage of the personal computer; and
    paying royalties only on the programs which have been selected, converted and stored in the storage in usable form.

8. A method of installing a variable selection of software programs on a computer including the steps of claim 7 wherein the method further includes the step of erasing the software programs which were not selected.

9. A method of installing selected software programs on a personal computer including the steps of claim 7 wherein the step of selecting the software for a particular personal computer includes the step of identifying the user of that personal computer.

10. A method of installing software programs including the steps of claim 7 wherein the step of selecting the software programs for a particular personal computer includes the step of identifying the job function of the user and selecting software which is appropriate for the job function.

11. A method of installing software programs including the steps of claim 10 wherein a listing of software for the user and his job function is displayed and an input determines whether software should be added or deleted as selected software programs to be included or excluded as usable software on the particular personal computer.

12. A personal computer system loaded with usable software comprising:
    a processor, a storage device and several programs loaded on the storage device in such a way as to make the programs unusable;
    a module associated with the processor for selecting certain of the programs loaded on the personal computer;
    a module associated with the processor and responsive to the selecting of certain programs to make the selected programs active and usable; and
    a module associated with the processor to make the programs which were not selected permanently unusable.

13. A personal computer system of the type described in claim 12 wherein the module for making unusable the programs which were not selected includes a module for erasing from the storage device the programs not selected.

14. A personal computer system of the type described in claim 12 wherein the module for selecting the programs which are selected includes a module for identifying the function of the user, and, in response to that function, for listing the programs which are appropriate for that function.

15. A personal computer of the type described in claim 12 wherein the module for selecting the programs which are selected includes a user input which can add or delete programs from a listing of programs which are appropriate for that user, whereby a customized set of programs are created for the user and royalties on the customized listing of programs is created.

16. A method of preparing different computers with different software programs, the steps of the method comprising:
    loading each computer with the superset of programs, each of the programs being in unusable form;
    selecting the subset of programs which are appropriate for the given computer, based on the user and his job function;
    converting the selected programs into usable form and storing them on the hardfile of the personal computer; and
    paying royalties only on the selected programs which have been converted and stored.

17. A method of the preparing personal computers including the steps set forth in claim 16 wherein the method further includes the step of erasing the programs which have not been selected.

18. A method of preparing personal computers the type described in claim 16 wherein the step of selecting the subset of programs includes a user input which serves to add to or delete from the list of programs based on user preferences.

19. A method of loading software onto personal computers including the steps of claim 16 wherein the steps of the method include generating a list of software converted for each personal computer so that the appropriate royalties can be paid.

20. A method of loading software onto personal computers including the steps of claim 19 wherein the step of generating the list of software further includes the step of transmitting that list of software to a host computer which assembles a list of software and royalties for a plurality of personal computers so that a single royalty can be paid for a plurality of personal computers.

21. A method of loading software onto personal computers including the steps of claim 20 wherein the step of generating the list of software further includes preparing a list of the software for each computer along with a list of the user and the functional organization for each personal computer.

\* \* \* \* \*